United States Patent [19]

Bäbler

[11] Patent Number: 5,034,430

[45] Date of Patent: Jul. 23, 1991

[54] NOVEL COMPOSITIONS CONTAINING MOLYBDENUM DISULFIDE

[75] Inventor: Fridolin Bäbler, Marly, Switzerland

[73] Assignee: Ciba-Geigy Corporation, Ardsley, N.Y.

[21] Appl. No.: 403,249

[22] Filed: Sep. 5, 1989

[30] Foreign Application Priority Data

Sep. 9, 1988 [CH] Switzerland ............... 3373/88

[51] Int. Cl.$^5$ .................. C08K 3/36; C08K 3/34; C08K 3/26; C08K 3/22

[52] U.S. Cl. .................. 523/171; 524/406; 106/479

[58] Field of Search .............. 523/171; 524/406; 106/479

[56] References Cited

U.S. PATENT DOCUMENTS

| | | | |
|---|---|---|---|
| 2,945,770 | 7/1960 | Suchow et al. | 106/479 |
| 3,082,179 | 3/1963 | Miller et al. | 523/171 |
| 3,382,201 | 5/1968 | Gutman et al. | 523/171 |
| 3,914,201 | 10/1975 | Kroenke | 524/406 |
| 4,328,750 | 5/1982 | Oberg et al. | 428/458 |
| 4,477,608 | 10/1984 | Bäbler et al. | 524/406 |
| 4,772,331 | 9/1988 | Noguchi et al. | 524/406 |
| 4,910,235 | 3/1990 | Satake et al. | 523/171 |

FOREIGN PATENT DOCUMENTS

| | | | |
|---|---|---|---|
| 2344737 | 9/1975 | Fed. Rep. of Germany | 524/406 |
| 1283654 | 11/1985 | Japan | 524/406 |
| 8703515 | 12/1985 | PCT Int'l Appl. | 524/406 |

OTHER PUBLICATIONS

Chem. Abst. 103, 161940s (1985).

Primary Examiner—Paul R. Michl
Assistant Examiner—Christopher P. Rogers
Attorney, Agent, or Firm—Luther A. R. Hall

[57] ABSTRACT

Compositions which can be processed to moulded articles which contain as high molecular weight organic material, a thermoplastic or a thermoset plastic or an elastomer and, as coloring component, 0.001 to 3.0% by weight of molybdenum disulfide, based on said high molecular weight organic material, in conjunction with at least one inorganic or organic pigment and/or a polymer-soluble dye and/or a pearlescent pigment.

8 Claims, No Drawings

NOVEL COMPOSITIONS CONTAINING MOLYBDENUM DISULFIDE

The present invention relates to novel compositions which can be processed to moulded articles and which contain as colouring component molybdenum disulfide in conjuction with at least one inorganic or organic pigment and/or a polymer-soluble dye and/or a pearlescent pigment.

The use of a mixture of graphite and one or more pigments or polymer-soluble dyes for colouring high molecular weight material which can be processed to moulded articles is already known from U.S. Pat. No. 4,477,608. Although it is thereby possible to obtain novel shades of silky lustre effect, these shades are somewhat dark on account of the grey-black inherent colour of the graphite.

The use of molybdenum disulfide as pearlescent pigment, for example for colouring polymethylmethacrylate in a dark blue nacre, is taught in U.S. Pat. No. 2,945,770. However, with the compositions disclosed in this reference it is only possible to prepare dark blue to black moulded articles.

It has now been found that high molecular weight organic material which can be processed to moulded articles can be coloured in bright metallic effect shades by using, as colouring component, a specific amount of molybdenum disulfide and at least one organic or inorganic pigment and/or a polymer-soluble dye and/or a pearlescent pigment. With such a composition it is possible to obtain metallic effect shades of high purity and of markedly brighter hue than with analogous compositions containing graphite. Moreover, smaller amounts of pigments or dyes may be used than when using graphite, thereby often producing a favourable effect on the melt indices of the polymer melts.

Accordingly, the invention relates to compositions which can be processed to moulded articles and which contain, as high molecular weight organic material, a thermoplastic or a thermoset plastic or an elastomer and, as colouring component, 0.001 to 3.0% by weight of molybdenum disulfide, based on said high molecular weight organic material, in conjunction with at least one inorganic or organic pigment and/or a polymer-soluble dye and/or a pearlescent pigment.

By moulded articles are meant in particular those obtainable by orientating stress, for example moulding, casting, ribbons, fibres and rolled sheets. Thermoplastics, thermoset plastics or elastomers which can be processed to moulded articles are, for example, cellulose ethers, cellulose esters such as ethyl cellulose, linear or crosslinked polyurethanes, linear, crosslinked or unsaturated polyesters, polycarbonates, polyolefins such as polyethylene, polypropylene, polybutylene or poly-4-methylpent-1-ene, polystyrene, polysulfones, polyamides, polycyclamides, polyimides, polyethers, polyether ketones such as polyphenylene oxides, and also poly-p-xylylene, polyvinyl halides such as polyvinyl chloride, polyvinylidene chloride or fluoride, polytetrafluoroethylene, polyacrylonitrile, acrylic polymers, polyacrylates, polymethacrylates, rubber, silicone polymers, phenol/formaldehyde resins, melamine/formaldehyde resins, urea/formaldehyde resins, epoxy resins, styrene-butadiene rubber, acrylonitrile-butadiene rubber or chloroprene rubber, singly or in mixtures.

The compositions of this invention will preferably contain a thermoplastic, most preferably polyvinyl chloride, polyethylene, polypropylene, polystyrene, polycarbonate, polyacrylate, polymethacrylate, polyamide, linear polyester, polyether, linear polyurethane, or the copolymers thereof. Most preferred are polyvinyl chloride, polycarbonate, polyester and polymethacrylate.

If the composition of this invention contains a polymer-soluble dye, then the high molecular weight organic material will preferably be a transparent thermoplastic, for example polystyrene, polymethacrylate or polycarbonate.

The molybdenum disulfide is suitably in particular molybdenum disulfide in flake or platelet form with a particle diameter of less than 100 $\mu$m and a thickness of up to 4 $\mu$m.

The optimum metallic colour effects can be obtained by varying the concentration of molybdenum disulfide within the indicated range. It is preferred to use 0.01 to 1.0% by weight of molybdenum disulfide, based on the high molecular weight organic material.

It is especially preferred to use molybdenum disulfide in flake or platelet form containing 60–95% by weight of particles having a median size of 1–12 $\mu$m. Conveniently they have a size of 0.1–24 $\mu$m.

Examples of organic pigments are: azo, azomethine, methine, anthraquinone, phthalocyanine, perinone, perylene, dioxazine, diketopyrrolopyrrole, thioindigo, iminoisoindoline, iminoisoindolininone, quinacridone, quinacridonequinone, flavanthrone, indanthrone, anthrapyrimidine or quinophthalone pigments, and also metal complexes of, for example, azo, azomethine or methine pigments. Pigments having good heat resistance are especially suitable. Preferred organic pigments are phthalocyanines, anthraquinones, perylenes, diketopyrrolopyrroles, iminoisoindolinones, quinacridones, indanthrones and disazo pigments.

Examples of inorganic pigments are metal oxides such as iron oxide, antimony yellow, lead chromates, lead chromate sulfates, lead molybdates, ultramarine blue, cobalt blue, manganese blue, chrome oxide green, hydrated chrome oxide green, cobalt green, and also metal sulfides such as cadmium sulfide, zinc sulfide, antimony trisulfide and cadmium sulfoselenides. Examples of preferred inorganic pigments are lead chromates, lead chromate sulfates, lead molybdates and iron oxides.

Examples of suitable polymer-soluble dyes are disperse dyes, preferably those of the anthraquinone series, for example hydroxyanthraquinones, aminoanthraquinones, alkylaminoanthraquinones, cyclohexylaminoanthraquinones, arylaminoanthraquinones, hydroxyaminoanthraquinones or phenylmercaptoanthraquinones, as well as metal compexes of azo dyes, preferably 1:2 chromium or cobalt complexes of monoazo dyes, and also fluorescent dyes such as those of the coumarin, naphthalimide, pyrazoline, acridine, xanthene, thioxanthene, oxazine, thiazine or benzthiazole series.

Examples of pearlescent pigments are natural and synthetic pearlescent pigments such as the silvery-white pearlescent pigments, for example the so-called natural "fish scale" pigments or, as synthetic pearlescent pigments, basic lead carbonate, bismuth oxychloride, bismuth oxychloride on carrier and, in particular, the titanium dioxide-coated mica pigments, which last mentioned pigments may also contain other coloured metal oxides such as iron oxide, cobalt oxide, manganese oxide or chromium oxide.

In addition to containing the molybdenum disulfide, the compositions of this invention preferably contain only one organic pigment or only one polymer-soluble dye, but more particularly only one organic pigment, most preferably a transparent organic pigment.

The concentration of pigment or dye or pearlescent pigment present in the composition of this invention in addition to the molybdenum disulfide is preferably 0.001 to 10% by weight, most preferably 0.01 to 3% by weight, based on the high molecular weight organic material.

Starting from commercially available molybdenum disulfide, the molybdenum disulfide used in the composition of this invention is obtained in the preferred state in known manner, for example by grinding in air jet, sand or ball mills. Substantially planar molybdenum disulfide particles in platelet or flake form are obtained, for example by wet grinding coarse crystalline molybdenum disulfide in a grinding apparatus which contains metal, glass or porcelain balls, plastic granules or sand grains as grinding elements. The grinding elements are set in motion, for example, by rotating the apparatus or by a vibration exciter or a stirrer.

It can be advantageous to treat the pigment and/or the polymer-soluble dye and/or the pearlescent pigment and/or the molybdenum disulfide, before use in the composition of this invention, with a texture improver. It is preferred to use a molybdenum disulfide which has been treated with a texture improver, for example before or after the treatment or grinding. It is preferred to use 0.02 to 25% by weight of a texture improver, based on the amount of molybdenum disulfide used.

Examples of suitable texture improvers are fatty acids of at least 12 carbon atoms such as stearic acid or behenic acid, or amides, salts or esters thereof, such as magnesium stearate, zinc stearate, aluminium stearate or magnesium behenate, and also quaternary ammonium compounds such as tri($C_1$-$C_4$)alkylbenzylammonium salts; and also plasticisers such as epoxidised soya bean oil, waxes such as polyethylene wax, resinic acids such as abietic acid, rosin soap, hydrogenated or dimerised colophonium, $C_{12}$-$C_{18}$alkanedisulfonic acids, alkylphenols, alcohols, diols or polyols containing not less than 5 carbon atoms.

The compositions of this invention preferably contain molybdenum disulfide which has been teated with stearic acid, stearylamine, hydrogenated abietic acid, epoxidised soya bean oil or a 1,2-diol, preferably with 1,2-hexanediol, 1,2-octanediol or 1,2-dodecanediol.

The compositions of this invention can be prepared by known methods. Molybdenum disulfide and pigment or dye may be added singly or premixed as toner or as solution or dispersion or in the form of a formulation to the high molecular weight organic material. Depending on the end use of the composition, it is possible to add further modifiers such as light stabilisers, heat stabilisers, plasticisers, binders or fillers.

The fine crystalline molybdenum disulfide particles present in platelet or flake form in the composition of this invention effect a uniformly metallic lustrous gloss. This effect is especially marked if the composition of the invention is irradiated by direct light from an artificial light source or by sunlight.

The lustre effects obtained with the composition of the invention can be clearly distinguished from effects achieved in other manner and are measured, for example, with a goniophotometer.

The use of molybdenum disulfide in the practice of this invention is economic. The heat resistance, lightfastness and fastness to weathering of molybdenum disulfide itself and the combination thereof with the pigments or polymer-soluble dyes are excellent. Furthermore, owing to its lubricant properties in particular, molybdenum disulfide can be very readily incorporated into the organic material and causes only insignificant wear of the processing apparatus employed (especially extruders) and virtually no braking effect. In particular, level, bright, opaque colorations of high purity are obtained. Even the electrical properties of the plastics material coloured with the composition of this invention are not affected on account of the low conductivity of molybdenum disulfide.

In contrast to many, especially organic, pigments, molybdenum disulfide causes almost no deformation in polyolefins. When incorporated into engineering plastics, for example polycarbonate, the composition of this invention make it possible to fabricate moulded articles with good notched impact strength.

In the following Examples parts are by weight, unless otherwise stated.

EXAMPLE 1

In a 500 ml glass bead mill, 15.5 g of molybdenum disulfide (ex Fluka AG) having a particle size smaller than 350 μm and 0.5 g of 1,2-octanediol are stirred in 120 ml of water. To the suspension are added 400 g of glass balls having a diameter of 3.5–4.0 mm and the mixture is ground for 9 hours at a temperature of ca. 20° C. and at a stirring rate of 320 rpm. The speed of the metal propeller mixer (5.5 cm diameter) is 0.92 m/sec. The molybdenum disulfide suspension is separated from the glass balls and then washed with a small amount of water and filtered. The filter residue is washed with cold water and dried at 70°–80° C. in a vacuum drier, affording 15.2 g of a grey molybdenum disulfide which, when pulverised, can be readily incorporated in plastics materials and gives lustrous grey colorations of excellent fastness properties. Scanning electron photomicrographs of the conditioned molybdenum disulfide show particles of marked flake-like to platelet appearance. A particle size determination made with a granulometer of type 715E 598, supplied by CILAS, Marcoussis/FR, shows that 85% of the particles have a size of 6 to 24 μm and a median size of 9.6 μm.

EXAMPLE 2

63.0 g of polyvinyl chloride LONZAVYL E 722 ® (ex LONZA AG), 3.0 g of REOPLAST 39 ® (epoxidised soya bean oil, ex CIBA-GEIGY AG), 1.5 g of IRGASTAB BC-26 ®, 0.5 g of IRGASTAB CH-300 ® (barium/cadmium stabilisers, ex CIBA-GEIGY AG), 32.0 g of dioctyl phthalate, 0.25 g of the molybdenum disulfide treated according to Example 1, and 0.25 g of C.I. Pigment Blue 15:3, No. 74 160, are mixed together in a glass beaker by hand using a stirring rod. The mixture is then rolled for 8 minutes to a soft PVC sheet with a thickness of 0.4 mm on a two-roll laboratory mill at a temperature of 160° C., a speed of 25 rpm and a friction of 1:1.2 by constant folding, removal and feeding. The soft PVC sheet so obtained is coloured in a tinctorially strong, level lustrous blue shade of excellent fastness to heat, light and migration.

EXAMPLE 3

The procedure described in Example 2 is repeated, replacing C.I. Pigment Blue 15:3 by C.I. Pigment Yellow 128, to give a sheet coloured in an opaque, level lustrous green shade of very good fastness to heat, light and weathering.

EXAMPLE 4

The procedure described in Example 2 is repeated, replacing C.I. Pigment Blue 15:3 by C.I. Pigment Red 177, to give a sheet coloured in a tinctorially strong, saturated, level lustrous reddish-violet shade of comparably good fastness properties.

EXAMPLE 5

The procedure described in Example 2 is repeated, replacing C.I. Pigment Blue 15:3 by the isoindolinone pigment C.I. Pigment Yellow 110, to give a soft PVC sheet coloured in a level lustrous greenish-yellow shade of excellent fastness to light, heat, weathering and migration.

EXAMPLE 6

A mixture comprising

| | |
|---|---|
| 92.0 g of vinyl-resin Vinnol H65D ® | (ex Wacker, Munich) |
| 8.0 g of vinyl copolymer Vestolit HIS 7587 ® | (ex Hüls) |
| 1.5 g of Reoplast 39 ® plasticiser (epoxidised soya bean oil) | (ex CIBA-GEIGY AG) |
| 1.4 g of IRGASTAB BC-10 ® stabiliser (barium/cadmium stabiliser) | (ex CIBA-GEIGY AG) |
| 1.4 g of IRGASTAB BC-29 ® (barium/cadmium stabiliser) | (ex CIBA-GEIGY AG) |
| 0.7 g of IRGASTAB CH-300 ® auxiliary stabiliser (organic phosphite) | (ex CIBA-GEIGY AG) |
| 0.4 g of IRGAWAX 370 ® lubricant (fatty acid ester) | (ex CIBA-GEIGY AG) |
| 0.2 g of IRGAWAX 360 ® lubricant (paraffin oil derivative) | (ex CIBA-GEIGY AG) |
| 0.25 g of TINUVIN 320 ® light stabiliser (benztriazole derivative) | (ex CIBA-GEIGY AG) | is prepared in a fluid mixer (supplied by Papenmeier KG, Detmold) by stirring for ca. 5 minutes at a speed of 1400 rpm.

1.5 g of the rigid PVC mixture so obtained, 0.05 g of readily dispersible perylenetetracarboxylic dianhydride pigment and 0.025 g of the molybdenum disulfide pigment obtained according to Example 1 are mixed in a Henschel mixer (Henschelwerke GmbH, Kassel) at room temperature for ca. 3 minutes at a speed of ca. 2000 rpm. The pigmented rigid PVC mixture so obtained is rolled on a roll mill for 6 minutes at 190° C. and 25 rpm and a friction of 1:1.2, and then pressed at 190° C. for 6 minutes on a Bürkle press between chromium-plated steel plates to a thickness of ca. 1 mm. The pressed sheet so obtained is coloured in a level, lustrous brownish-red shade of excellent fastness to light and weathering.

EXAMPLE 7

The procedure described in Example 6 is repeated, replacing perylenetetracarboxylic dianhydride by the lead chromate pigment, C.I. Pigment Yellow 34, to give a pressed sheet coloured in a level lustrous greenish-yellow shade of comparably good fastness properties.

EXAMPLE 8

A mixture of 0.5 g of the molybdenum disulfide pigment obtained according to Example 1, 0.5 g of the isoindolinone pigment C.I. Pigment Yellow 110, 1.0 g of antioxidant (IRGANOX 1010 ®, ex CIBA GEIGY AG) and 1000 g of high density polyethylene granules (VESTOLEN ® A 6016, ex Chem. Werke Hüls) is stirred for 15 minutes in a glass flask on a roller gear table. The mixture is then extruded in two passes in a single screw extruder. The granulate so obtained is moulded to plates at 220° C. in an injection moulding machine (Allround Aarburg 200) and then post-formed for 5 minutes at 180° C. The mouldings are coloured in a lustrous green shade of excellent fastness properties.

EXAMPLE 9

The procedure described in Example 8 is repeated, replacing C.I. Pigment Yellow 110 by the anthraquinoid pigment, C.I. Pigment Blue 60, to give a pressed sheet coloured in a lustrous blue shade of comparably good fastness properties.

EXAMPLE 10

The procedure described in Example 8 is repeated, replacing 1000 g of VESTOLEN A6016 ® by 1000 g of Polystyrene 165 H ® polystyrene granules (ex BASF) and using 0.25 g instead of 0.5 g of the molybdenum disulfide obtained according to Example 1, and also replacing C.I. Pigment Yellow 110 by 3-methoxypropyl copper phthalocyaninetetrasulfonamide, to give pressed sheets coloured in a lustrous dark blue shade of excellent fastness properties.

EXAMPLE 11

A mixture of 0.25 g of the molybdenum disulfide obtained according to Example 1, 0.5 g of 3-methoxypropyl copper phthalocyaninetetrasulfonamide, 1.0 g of IRGANOX 3000W ® antioxidant (ex CIBA-GEIGY AG) and 1000 g of MACROLON 3000W ® polycarbonate (ex BAYER) is premixed for 15 minutes in a glass bottle on a roller gear bed. Thereafter the mixture is extruded and granulated in one passage in a single-screw extruder. The granules so obtained are injection moulded in an injection moulding machine at a residence time of 5 minutes at 250° C. to 1.5 mm thick sheets. The pressed sheets are coloured in a lustrous blue shade of excellent fastness properties.

EXAMPLE 12

The procedure described in Example 11 is repeated, replacing 3-methoxypropyl copper phthalocyaninetetrasulfonamide by the isoindolinone pigment, C.I. Pigment Yellow 110, to give a pressed sheet which is coloured in a lustrous green shade of excellent fastness properties.

A pressed sheet coloured in a lustrous reddish-violet shade of excellent fastness properties is obtained by using the metal complex C.I. Solvent Red 7 instead of C.I. Pigment Yellow 110.

EXAMPLE 13

The procedure described in Example 11 is repeated, replacing 3-methoxypropyl copper phthalocyaninetetrasulfonamide by the anthraquinoid pigment, C.I. Pigment Red 177, and using 0.5 g instead of 0.25 g of the molybdenum disulfide obtained according to Example 1, to give a pressed sheet which is coloured in lustrous reddish violet shade of excellent properties.

A pressed sheet coloured in a lustrous reddish-violet shade of excellent fastness properties is obtained by using the indigoid pigment, C.I. Solvent Red 181, instead of C.I. Pigment Red 177.

EXAMPLE 14

The procedure described in Example 11 is repeated, replacing MACROLON 3000W ® polyamide granules by VESTAMID ® (ex Hüls), to give a coloured polyamide pressed sheet of comparable fastness properties.

EXAMPLE 15

The procedure described in Example 8 is repeated, replacing VESTOLEN A6016 ® polypropylene granules by MOPLEN S50G ® (ex Montedison), to give a coloured polypropylene pressed sheet of comparable fastness properties.

EXAMPLE 16

A mixture of 0.25 g of the molybdenum disulfide obtained according to Example 1, 0.5 g of the polymer-soluble dye, C.I. Solvent Orange 60, 1.0 g of IRGANOX 1010W ® antioxidant (ex CIBA-GEIGY AG) and 1000 g of MACROLON 3000W ® polycarbonate granules (ex BAYER) is premixed for 15 minutes in a glass bottle on a roller gear bed. Thereafter the mixture is extruded and granulated in one passage in a single-screw extruder. The granules so obtained are injection moulded in an injection moulding machine at a residence time of 5 minutes at 290° C. to 1.5 mm thick sheets. The pressed sheets are coloured in a lustrous brown shade of excellent fastness properties.

Pressed sheets coloured in a lustrous brown shade of excellent fastness properties are obtained by using DEGALAN G7 ® polymethylmethacrylate granules instead of polycarbonate granules and injection moulding at 220° C. instead of 290° C.

EXAMPLE 17

The procedure described in Example 2 is repeated, replacing C.I. Pigment Blue 15:3 (No. 74160) by the iminoisoindoline pigment of formula

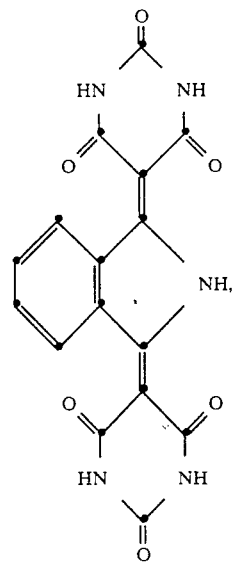

to give a sheet which is coloured in a level lustrous greenish yellow shade of comparably good fastness properties.

EXAMPLE 18

The procedure of Example 2 is repeated, replacing C.I. Pigment Blue 15:3 (No. 74160) by the diketopyrrolopyrrole pigment, C.I. Pigment Red 254, to give a sheet which is coloured in a level, lustrous brownish red shade of comparably good fastness properties.

EXAMPLE 19

A mixture of 100 g of TERLENKA ® polyethylene terephthalate granules (ex AKZO Fibres, Holland), 0.1 g of the molybdenum disulfide obtained according to Example 1 and 0.1 g of quinacridone pigment, C.I. Pigment Violet 19, are mixed for 15 minutes in a glass bottle on a roller gear bed. The mixture is extruded to a ribbon in a laboratory extruder of type 25/25D/T supplied by COLLIN GmbH, Munich. The ribbon is coloured in a level, lustrous violet shade of excellent lightfastness.

EXAMPLE 20

The procedure described in Example 19 is repeated, using APILON 52-651 ® polyurethane (ex API spa, Mussolente, Italy) instead of TERLENKA ®, and replacing C.I. Pigment Violet 19 by the dichloroquinacridone pigment, C.I. Pigment Red 209, to give a PUR ribbon which is coloured in a level, lustrous reddish violet shade of excellent lightfastness.

EXAMPLE 21

The procedure of Example 19 is repeated, using ULTRANYL KR 4510 ® polyphenylene ether/polyamide blend instead of TERLENKA ® and replacing C.I. Pigment Violet 19 by the copper phtahlocyanine pigment, C.I. Pigment Blue 15:3, to give a ribbon which is coloured in a level, lustrous blue shade of excellent fastness properties.

EXAMPLE 22

The procedure described in Example 2 is repeated, using 0.1 g instead of 0.25 g of molybdenum disulfide and replacing 0.25 g of C.I. Pigment Blue 15:3 (No. 74160) by 0.5 of the pearlescent pigment, IRIODIN Ti-100F ® (ex Merck), to give a lustrous grey metallic sheet with excellent fastness properties.

EXAMPLE 23

The procedure described in Example 22 is repeated, additionally using 0.15% of the azo pigment, C.I. Pigment Red 221, to give a sheet coloured in a level, lustrous reddish violet shade of comparably good fastness properties.

What is claimed is:

1. A composition, which can be processed into a molded article, which comprises
    (a) a high molecular weight organic material which is a thermoplastic, a thermoset or an elastomer, and
    (b) 0.001 to 3.0% by weight, based on said high molecular weight organic material, of molybdenum disulfide, in flake or platelet form having a particle diameter of less than 100 μm and a thickness of up to 4 μm, wherein 60–95% of the molybdenum disulfide particles in flake or platelet form have a median size of 1–12 μm, in conjunction with
    (c) 0.001 to 10% by weight, based on the high molecular weight organic material, of at least one additional inorganic or organic pigment, either of which may be pearlescent, or polymer-soluble dye or mixture thereof.

2. A composition according to claim 1, wherein the high molecular weight organic material is a thermoplastic.

3. A composition according to claim 1, wherein the high molecular weight organic material is a polyvinyl chloride, polyethylene, polypropylene, polystyrene, polycarbonate, polyacrylate, polymethacrylate, polyamide, linear polyester, polyether, linear polyurethane, or a copolymer thereof.

4. A composition according to claim 1, wherein the concentration of molybdenum disulfide is 0.01 to 1.0% by weight, based on the high molecular weight organic material.

5. A composition according to claim 1, wherein only one organic pigment is used in addition to the molybdenum disulfide.

6. A composition according to claim 1, wherein the polymer-soluble dye is an anthraquinone dye or a metal complex of an azo dye.

7. A composition according to claim 1, which contains component C in an amount of 0.01 to 3% by weight, based on the high molecular weight organic material.

8. A composition according to claim 1, which contains molybdenum disulfide which is treated with stearic acid, stearylamine, hydrogenated abietic acid, epoxidised soya bean oil or a 1,2-diol.

* * * * *